United States Patent [19]

Landman

[11] 3,750,252

[45] Aug. 7, 1973

[54] SOLDER TERMINAL STRIP

[75] Inventor: Dirk Landman, Mechanicsburg, Pa.

[73] Assignee: E. I. du Pont de Nemours and Company, Wilmington, Del.

[22] Filed: May 1, 1972

[21] Appl. No.: 249,305

[52] U.S. Cl. .............................. 29/191.6, 29/193.5
[51] Int. Cl. ............................................ H01b 5/14
[58] Field of Search ...................... 174/DIG. 3, 52 S, 174/84 R, 88 R, 94 R; 113/119; 228/56; 29/500, 626, 628, 193, 193.5, 191.6

[56] References Cited

UNITED STATES PATENTS 3,381,372 5/1968 Capano .................. 174/DIG. 3 UX
3,469,061 9/1969 Costello ................... 317/101 F UX
3,689,684 9/1972 Cox, Jr. et al. ............ 174/DIG. 3 X

*Primary Examiner*—Darrell L. Clay
*Attorney*—Thomas Hooker

[57] ABSTRACT

A terminal strip having a number of closely spaced solder terminals with a continuous solder wire extending along the strip and secured to each terminal. The terminals are brought into physical engagement with spaced contacts and heated to melt the solder wire. The solder melts and coalesces on the individual contacts to form independent soldered connections.

8 Claims, 6 Drawing Figures

SOLDER TERMINAL STRIP

The invention relates to a terminal strip and method for forming the soldered connections. The strip includes a number of solder terminals adapted to be mounted in physical engagement with contact pads on a circuit member. A continuous solder wire extends along the strip in contact with each solder terminal. After the terminals are physically secured to the circuit member the terminals, solder wire and pads are heated to melt the solder which coalesces on the individual solder terminal-contact pad pairs to form soldered connections electrically independent of adjacent soldered connections. The solder terminals are attached to a carrier strip which may be removed after completion of the soldering operation.

The invention represents an improvement over conventional solder terminals of the type disclosed in U.S. Pat. No. 3,351,704 where an individual mass of solder is attached to each soldering terminal. When the terminal is heated the solder melts and forms the desired solder connection with a contact. U.S. Pat. No. 3,381,372 discloses melting a solder ring to form individual solder connections between overlapping circuit paths.

Other objects and features of the invention will become apparent as the description proceeds, especially when taken in conjunction with the accompanying drawings illustrating the invention, of which there is a single sheet. In the drawings.

Figures 1, 2, 3, 4, 5, 6:
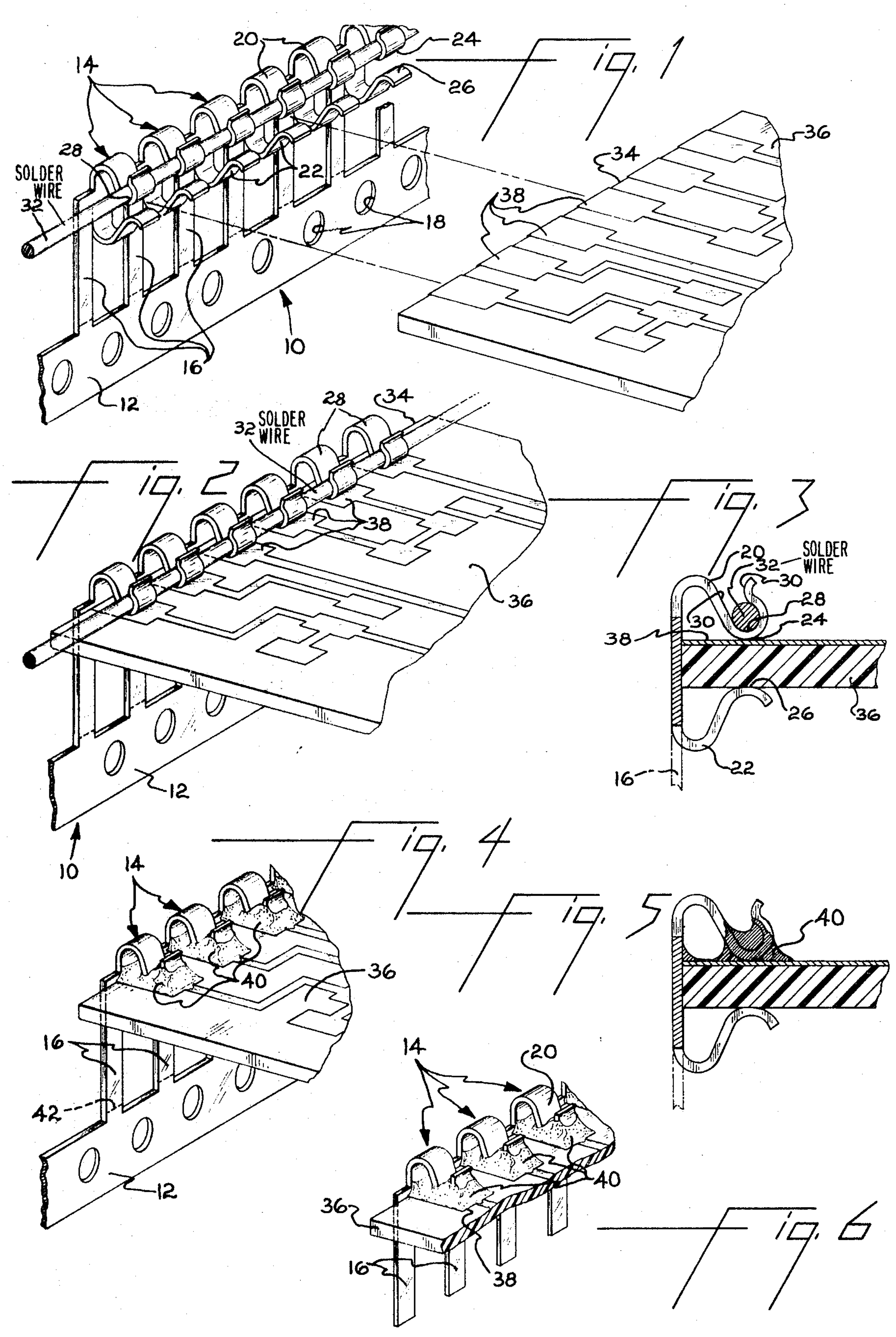
FIG. 1 is a perspective view of a length of the solder terminal strip in position to be brought into physical engagement with a circuit member.
FIG. 2 illustrates the terminal strip mounted on the edge of the circuit member with the solder contacts engaging contact pads on the circuit member.
FIG. 3 is a side view of one of the solder terminals mounted on the circuit member as illustrated in FIG. 2.
FIG. 4 illustrates the terminal strip and circuit member after the soldering operation.
FIG. 5 is a view similar to that of FIG. 3 after soldering.
FIG. 6 is similar to FIG. 4 illustrating the soldered terminals following removal of the carrier strip.

As illustrated in FIG. 1, the solder terminal strip 10 includes a continuous carrier strip 12 with a number of individual solder terminals 14 extending along the strip at regular intervals and secured thereto by legs 16. Pilot holes 18 may be provided in strip 12 to facilitate indexing of the terminal strip during manufacture and mounting of the terminals 14 on a circuit member.

The terminals 14 each include a pair of offset spring arms 20 and 22 extending to one side of legs 16. The end of each spring arm is bent away from the adjacent spring arm to provide smooth contact surfaces 24 and 26 to facilitate moving the terminal over the edge of a circuit member such as a circuit board or a ceramic substrate. The free end of arm 20 is bent back toward the median portion of the arm to provide a solder wire receiving clip or recess 28. A smooth lead-in 30 is provided on both sides of the mouth of recess 28 to facilitate positioning a solder wire within the recess. A continuous solder wire 32 extends along the length of strip 10 and is secured to the terminals 14 in recesses 28.

The closely spaced solder terminals 14 of FIG. 1 are mounted on the edge 34 of circuit member 36 with the contact 24 of each spring arm 20 resting on a metal contact pad 38. The arms 20 and 22 form a clip for engaging the edge of member 36. The spacing between the spring arms 20 and 22 is somewhat less than the thickness of the circuit member 36 at pads 38 so that the arms are resiliently spread apart slightly when forced on to the pads and clamp the edge of the circuit member thus assuring a positive physical connection between arm 20 and pad 38. FIG. 2 illustrates the terminals after they have been physically mounted on circuit member 36. Carrier strip 12 holds the terminals in proper spaced relation to permit simultaneous mounting of a number of terminals on the member 36 with the contacts resting on pads 38.

The desired solder connections between terminals 14 and the individual pads 38 are achieved by heating the terminals and solder pads of FIG. 2 to melt the solder wire. As illustrated in FIGS. 4 and 5, the molten solder coalesces on the individual contact arms 20 and pads 38 to form independent solder electrical connections between terminals 14 and contact pads 38. There are no solder connections between adjacent pads. The solder in the wire extending between the terminals is melted and is drawn by capillary action to one of the adjacent terminal-pad contacts preventing undesirable cross or short circuits. Depending upon the given application, the solder wire 32 may include a fluxing agent to facilitate the forming of the soldered joints.

When the soldering operation has been completed the terminals 14 are held on circuit member 36 by the soldered connections 40. Carrier strip 12 may then be broken away from the terminal legs 16 at weakened areas 42 so that the individual soldered terminals 14 are electrically isolated. The circuit member 36 with terminal legs 16 extending therefrom may then be mounted in a connector block or on another circuit member in a conventional manner.

The terminal solder strip 10 greatly simplifies the job of soldering a number of terminals to closely spaced contact pads. The terminals 14 are carried on strip 10 at the same spacing as the spacing of the contact pads so that the soldering operation is performed by first engaging the terminals 14 on the contact pads at the edge of the circuit member and then heating the terminals so that the solder wire melts and automatically forms the solder connections. No longer is it necessary to individually position each solder terminal on it's respective contact pad and then hand solder the terminal to the pad.

On a production basis the solder terminals 14 can be mounted on a circuit member and soldered thereto completely automatically by machine. The strip 10 is unwound from a supply reel and fed to a position where a lead group of terminals is to one side of the edge of a circuit member. The terminals are then automatically pushed on to the circuit member with the arms engaging the pads and then heated to form the solder connection. Subsequently the carrier strip 12 may be automatically cut from the legs 16 of the soldered terminals. This operation can be performed rapdily and reliably to reduce the cost of soldering terminals to a circuit member while also improving the reliability of the soldered connections.

While the disclosed terminals 10 are intended to be clipped on one side of a circuit panel, the invention is not limited to such clip-type terminals. Other kinds of terminals can be soldered by the use of a continuous solder wire. For example, a continuous solder wire could be secured to the spade disconnect terminals of U.S. Pat. No. 3,351,704 to improve the soldering of the terminals to spade contacts.

While I have illustrated and described a preferred embodiment of my invention, it is understood that this is capable of modification, and I therefore do not wish to be limited to the precise details set forth, but desire to avail myself of such changes and alternations as fall within the purview of the following claims.

What We claim as our invention is:

1. A terminal strip of the type having a carrier strip with a number of terminals closely spaced along the carrier strip and removably attached thereto, each terminal including a contact for forming a soldered electrical connection with a circuit element, the improvement comprising a continuous solder wire extending along the terminal strip and in engagement with each terminal whereby upon positioning said contacts against circuit elements and heating the solder wire, the wire melts and the solder coalesces on each contact-circuit element pair to form independent soldered electrical connections.

2. A terminal strip as in claim 1 wherein each terminal includes a pair of opposed arms adapted to resiliently engage the edge of a circuit panel.

3. A terminal strip as in claim 1 wherein each terminal includes holding means physically securing the solder wire to the terminal.

4. A terminal strip as in claim 3 wherein each holding means comprises a wire engaging clip.

5. A solder type terminal strip adapted to be mounted on a circuit panel comprising a continuous carrier strip, a plurality of terminals closely spaced along the carrier strip and removably secured thereto, each terminal including a pair of spaced spring arms forming a clip contact for mounting on the edge of a circuit panel with one spring arm engaging a circuit pad on the panel to form a contact pair, and a continuous length of solder wire running along said terminal strip in engagement with said terminals adjacent said contact pairs whereby upon heating of said solder wire the solder melts and coalesces about the individual contact pairs to form independent solder connections between the spring legs and circuit pads.

6. A terminal strip as in claim 5 wherein each terminal includes a solder wire receiving recess and the solder wire is secured to said terminals in said recesses.

7. A terminal strip as in claim 6 wherein said recess comprises a wire receiving clip on said one spring arm of each terminal.

8. A terminal strip of the type having a number of spaced terminals, removable means securing the terminals in spaced relation to one another, each terminal including a contact for forming a soldered electrical connection with a circuit element, the improvement comprising a continuous solder wire extending along the terminals and in engagement with each terminal whereby upon positioning said contacts adjacent circut elements and heating the solder wire, the wire melts and the solder coalesces on each contact-circuit element pair to form independent soldered electrical connections.

* * * * *